United States Patent [19]

Fischer et al.

[11] 4,194,814
[45] Mar. 25, 1980

[54] TRANSPARENT OPTHALMIC LENS HAVING ENGRAVED SURFACE INDICIA

[75] Inventors: David J. Fischer, Sarasota; James A. McCandless, St. Petersburg, both of Fla.; James D. Hager, Santa Monica, Calif.

[73] Assignee: Bausch & Lomb Incorporated, Rochester, N.Y.

[21] Appl. No.: 850,133

[22] Filed: Nov. 10, 1977

[51] Int. Cl.$^2$ .............................. G02C 7/04
[52] U.S. Cl. .............. 351/160 R; 346/76 L; 351/160 H; 358/297
[58] Field of Search .............. 351/160, 177; 358/297; 346/76 L

[56] References Cited

U.S. PATENT DOCUMENTS

| | | | |
|---|---|---|---|
| T903,014 | 10/1972 | Dempski | 219/121 LM |
| 1,475,473 | 11/1923 | Drescher | 350/175 R |
| 3,440,388 | 4/1969 | Otstot et al. | 219/69 |
| 3,549,733 | 12/1970 | Caddell | 358/297 |
| 3,657,085 | 4/1972 | Hoffmeister et al. | 204/157.1 R |
| 3,833,786 | 9/1974 | Brucker | 351/160 UX |
| 4,039,827 | 8/1977 | Zdrok et al. | 250/271 |

OTHER PUBLICATIONS

Carco, Inc., Sales Brochure, Laser Marking Division of Carco, Inc., Detroit, Mich., Aug. 1976.
Harris et al., "Laser Etching Arrangement," *IBM Technical Disclosure Bulletin*, vol. 10, No. 1, (Jun. 1967), p. 63.
Neill, "Electronic Venting of Corneal Contact Lenses," *Contacto*, vol. 11, No. 2, Jun. 1967, pp. 9-11.

*Primary Examiner*—John K. Corbin
*Assistant Examiner*—Scott J. Sugarman
*Attorney, Agent, or Firm*—Frank C. Parker; Ronald L. Lyons

[57] ABSTRACT

Indicia are formed in the surface of an ophthalmic contact lens by sublimating lens material with a high intensity beam of radiation. A beam of light from a laser is directed through one or more cooperating masks having openings defining desired indicia. The light which passes through the masks is directed upon a surface of a contact lens, advantageously near the periphery thereof. By selecting a proper wavelength and controlling the amount of energy directed upon the lens surface the depth of sublimation of lens material can be controlled. In this manner symbols can be formed upon the lens for uniquely identifying it.

10 Claims, 3 Drawing Figures

TRANSPARENT OPTHALMIC LENS HAVING ENGRAVED SURFACE INDICIA

BACKGROUND OF THE INVENTION

The present invention relates to ophthalmic lenses adapted for direct contact with eye tissue, and more particularly to procedures for forming identifying symbols upon such lenses.

It has long been known that the vision of the human eye can be aided by disposing a small, transparent lens directly upon the surface of the eye, the contours of the lens supplementing and correcting the effect of the biological lens within the eyeball. In recent years the materials and techniques for manufacturing such lenses have improved markedly, with the result that contact lenses are being worn in ever-increasing numbers. Certain recent advances in contact lens technology, particularly the introduction of the so-called "soft" contact lens, has led to still further popularity of contact lenses. Unlike the well-known "hard" contact lens, the soft lens is relatively pliable, particularly when it is in use and hydrated.

Certain problems inhere in the use of contact lenses. Of particular interest is the difficulty in uniquely identifying lenses. With the aid of specialized intrumentation the optical qualities of a given contact lens may be measured, and thus in some respects a lens may be identified. However, in the broad sense it is difficult to uniquely identify lenses inasmuch as they are relatively small and look substantially alike even under mangification.

The ability to identify individual lenses, though it would be extremely useful to lens wearers and to ophthalmologists and opticians, has so far eluded the industry. It would, for instance, be extremely useful for a wearer to be able to differentiate between lenses for left and right eyes. Still further, it would be essential to identify lenses in the event they are accidentally commingled. This could occur at various stages during their manufacture, shipment or preparation in the office of a fitter. In addition, it would in many cases be extremely useful to be able to identify the manufacturer, material lot, and production run of a given lens; and finally to be able to identify the optical characteristics of a lens without actually measuring them.

A number of solutions have been suggested, and in some cases experimented with. For instance, identifying characters could be imprinted upon the surface of the lens. This approach, however, requires the application of a separate material to the lens with the accompanying danger of its separation therefrom. Further, inasmuch as some contact lenses are subject to rigid governmental requirements, the addition of extraneous materials would require lengthy testing and qualification procedures.

It has further been suggested that identifying indicia be machined or mechanically etched into the surface of a contact lens. While this approach has been tried, it has met with little success due to the difficulty of physically machining or scratching marks into the surface of the lens with conventional apparatus. The difficulty in actually machining the surface of the lens with miniscule tools is apparent, although some efforts have been made to scratch symbols into a lens surface using a pantograph.

For all of the foregoing reasons, it will be appreciated that there is a need for an improved method for applying identifying indicia to contact lenses, which does not require the addition of extraneous material to the lens itself and which is economically feasible.

It is therefore an object of the present invention to provide a method of applying identifying indicia to contact lenses.

Another object is to provide an improved method for etching symbols into the surface of an ophthalmic contact lens.

A further object is to provide a system for reliably and uniquely applying identifying indicia to sequentially-presented contact lenses.

Yet another object is to provide a contact lens having identifying indicia formed by the impingement of a high-energy beam of light that interacts with the lens material.

SUMMARY OF THE INVENTION

In accordance with one aspect of the invention, the foregoing objects are achieved by providing a source of high intensity electromagnetic energy, preferably a laser, which produces electromagnetic energy at a specified wavelength and of an predetermined intensity. A eye contacting lens to be marked is then disposed in the path of the beam of electromagnetic energy from the high intensity source, and appropriate means (such as a suitable mask, for example) are provided to cause the beam to impinge upon the lens surface in a preselected pattern. The laser beam is then briefly applied to the lens surface in this preselected pattern in a manner such that the beam which impinges upon the lens surface sublimates or vaporizes the lens material to a controlled depth and provides the desired markings in the lens surface.

In a preferred embodiment, automated means are used to sequentially vary the configuration of a mask in synchronism with the presentation of successive contact lenses in the high intensity electromagnetic energy path. Alternatively, an array of high intensity energy sources, such as lasing diodes, for example, are provided and selectively energized to direct a predetermined pattern of high energy light upon the surface of the lens.

In accordance with the invention, it has unexpectedly been discovered that preselected portions of a contact lens surface may be sublimated or vaporized to form identifying indicia in the surface despite the fact that the lens itself is transparent and is provided with a polished surface. By selecting the proper energy wavelength and intensity the surface of a contact lens may be marked to a controlled, limited extent and the markings so made, although extremely small, can be visually perceived either with or without the use of optical aids, thereby facilitating an identification of the lens.

It has also been discovered that little if any proteinaceous material accumulates in the craters which constitute the marks formed in the lens surface. Such material as does accumulate is readily removed by normal lens cleaning procedures. Furthermore, the edges of the craters neither inflame nor irritate the eyelid of the lens wearer. The markings provided on the lens surface in accordance with the invention if restricted to the non-corrective portions of the lens, e.g. near the lens periphery, are not perceived by the lens wearer and do not affect or interfere with his visual acuity.

In accordance with the invention the wavelength and intensity of the electromagnetic energy, such as, for example, a laser beam, is selected to rapidly sublimate or vaporize predetermined areas of the lens material, thereby to provide the desired identifying indicia in the lens surface. As will be appreciated by those skilled in the art, values of energy wavelength and intensity are selected which will not pass through the lens, but instead will vaporize or sublimate the material to a depth that can be controlled by regulation of the period of exposure of any predetermined area of the lens surface to the high energy radiation. The particular wavelength, intensity of radiation and period of its application to a preselected location on the lens surface may be established for any particular material by routine experimentation. Thus, for example, a soft, hydrated contact lens formed of a hydrophilic polymer such as, for example, that disclosed in U.S. Pat. No. 3,721,657, was successfully marked utilizing a model 901 laser of the helium-$CO_2$-nitrogen type manufactured by Lumonics Research Ltd. Of Ontario, Canada, which emitted light at a wavelength of about 10.6 micrometers for bursts of about one microsecond. An energy concentration of from 1 to 3 Joules per square centimeter at the surface of the lens target was found to be suitable. The depth of the marking in the surface in the lens was of the order of 0.01 mm. As will be appreciated by those skilled in the art, higher energy densities or repeated applications of bursts of energy to a preselected location at the lens surface will vaporize or sublimate the lens material to a greater depth. In this regard, it was unexpectedly discovered that successive applications of bursts of energy resulted in progressively less penetration of the target lens in each succeeding burst. Preferably, therefore, the energy density of the laser beam and the period of its application are adjusted so that marks having a sufficient depth may be formed without the necessity of applying repeated bursts of energy of any one preselected location on the lens surface.

In general, any eye contacting lens, corneal or scleral, may be marked in accordance with the present invention. Included among the lenses that may be so marked are the "hard" lenses such as those formed of glass as well as those described, for example, in U.S. Pat. No. 3,221,083—Crandon (lenses formed of allyl diglycol carbonate cured with a vinyl-type monomer, such as maleic anhydride or glycidyl methacrylate); and U.S. Pat. No. Re. 29,229 (lenses prepared from polymers of hexafluoroacetone-tetrafluoroethylene-ethylene, or of perfluoroalkylethyl methacrylates or of perfluoro-2-methylene-4-methyl 1,3 dioxolane); "soft" or hydrophilic lenses such, for example, as disclosed in U.S. Pat. No. 3,721,657 (hydrophilic lens formed of a copolymer of vinyl pyrrolidone and hydroxy-ethylmethacrylate cross-linked with diethylene glycol dimethacrylate); and organometallic lenses such, for example, as disclosed in U.S. Pat. No. 3,959,102 (lens formed of a cross-linked graft copolymer of a polyorganosiloxane and polyvinyl pyrrolidone); U.S. Pat. No. 3,228,741 (lens fabricated from transparent silicone rubber); and similar silicone polymer, resin or rubber materials. The soft or hydrophilic lenses, such as disclosed in U.S. Pat. No. 3,721,657, for example, may be marked in accordance with the invention either prior or subsequent to hydration. In this connection, it has been discovered that although the parameters (i.e., wavelength and intensity, period of application) of the electromagnetic energy directed to the hydrated lens must be adjusted to compensate for the degree of hydration, the requisite degree of vaporization or sublimation of the lens material occurs despite the presence of water in the lens.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF PREFERRED EMBODIMENTS

Figure 1:
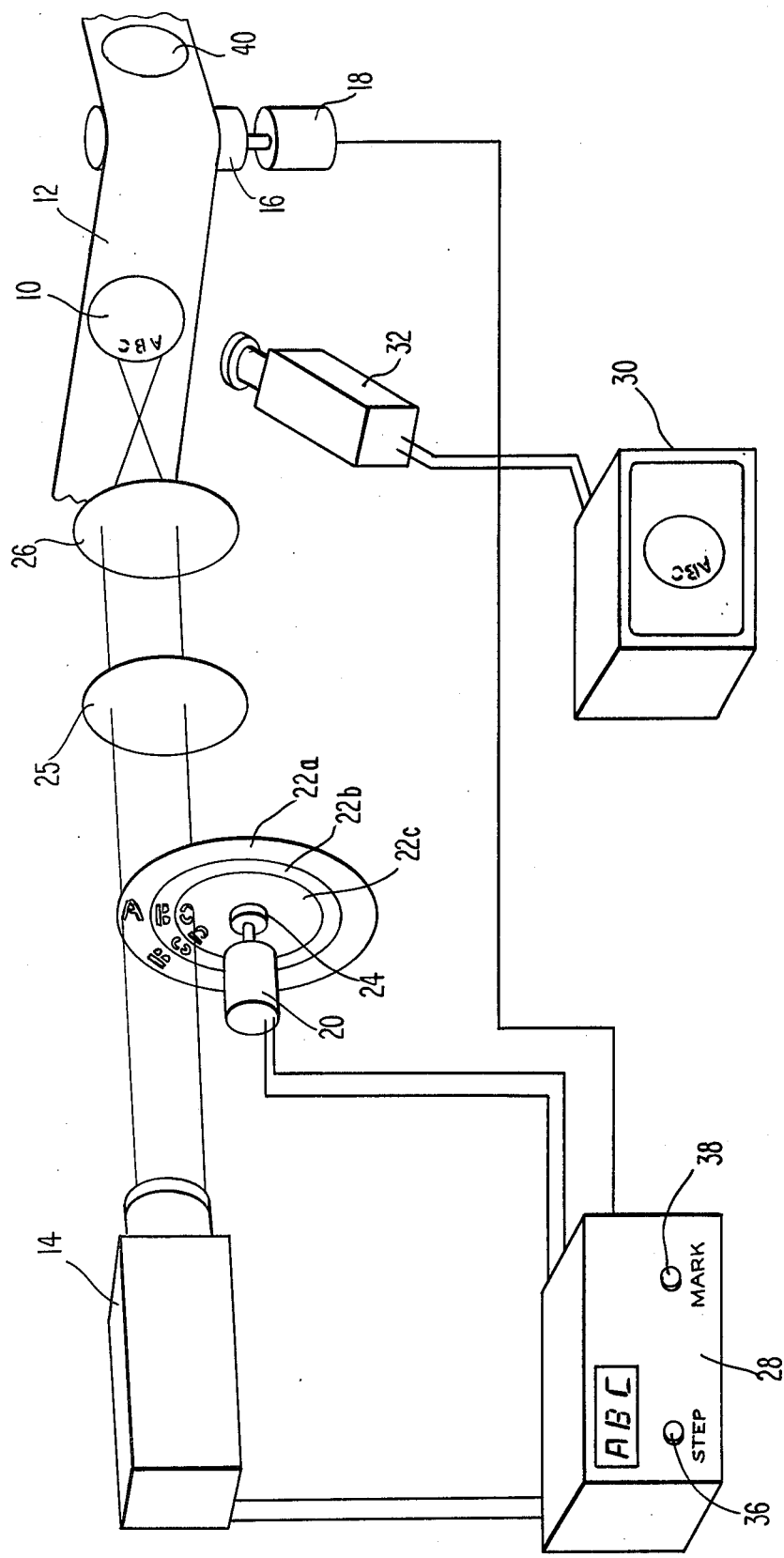
FIG. 1 illustrates one system for applying indicia to contact lenses.

Referring to FIG. 1, an eye contacting lens 10 mounted upon a conveyor 12 is brought into registration with a beam of energy originating at a laser 14. The conveyor is engaged by a roller 16 or the like, coupled to a driving mechanism such as a stepping motor 18. A second stepping motor 20 is coupled to a series of apertured masks 22a-22c through an appropriate drive mechanism 24. A filter 25 is disposed in the path of the beam to afford depth control, and a positive lens 26 is provided to concentrate the light passing through masks 22a-22c upon the surface of lens 10.

Focusing means 26, generally illustrated as a conventional optical lens, must be formed of an appropriate material, such as germanium for use with infrared lasers. Alternatively, a focusing mirror may be used in place of a lens. In view of the wavelength of the light emanating from laser 14, to be discussed hereinafter, the focusing means is advantageously formed of a material which is transparent to and refracts the wavelength utilized. Masks 22a-22c may be formed of any material which is opaque to the laser beam and which may be worked with sufficient precision to form a clean, well-defined opening. A mask formed of thin bronze or beryllium has been found to work well in practice.

A control 28 is provided for operating laser 14, and for energizing stepping motors 18, 20 at appropriate times. Finally, a television receiver 30 is coupled to a camera 32 for monitoring operation of the system.

While many types of lasers may be adapted for use with the present invention, a successfully-tested embodiment utilized a Model 901 laser of the helium-$CO_2$-nitrogen type manufactured by Lumonics Research Limited of Ontario, Canada. As will be more fully discussed hereinafter this laser produces a beam of light energy at a wavelength which effects sublimation of cross-linked polymeric material including both dry (anhydrous) and water-bearing (partially or fully hydrated polymers. It will be appreciated that other types of high-intensity sources which produce sufficient concentrated radiant energy for sublimating the surface of a contact lens may be used. Accordingly, the term "high intensity light energy" as is used herein denotes rediant electromagnetic energy which is of a proper wavelength and is sufficiently concentrated to sublimate contact lens material.

In accordance with the present invention it will now be appreciated that it is possible, using the proper energy wavelength and intensity, to sublimate selected portions of the lens surface to form identifying symbols and the like. This may be accomplished by using a laser emitting a wavelength in the infrared band to mark the highly polished lens. It has been discovered that the surface of a contact lens can be successfully sublimated to a limited depth and further that markings thus made, although of extremely small dimensions, can be visually perceived, albeit often with the use of optical aids.

Further, although it is understood that previous attempts to laser-mark wet or water-bearing materials have been unsuccessful it has been discovered that satisfactory marking of soft contact lenses can be achieved both before and after hydration.

Soft lenses may be formed by a polymerization process such as disclosed in U.S. Pat. No. 3,721,657 and formed into lens blanks by the method described in U.S. Pat. No. 3,221,083—Crandon. The hard lens blanks are cut and polished to the desired contours and then placed in a fixture, such as conveyor 12 of the drawing. An appropriate mask or group of masks is then assembled over the lens surface. After the focusing means 25 is interposed in the radiation path between the mask and the lens surface, laser 14 is energized to direct a beam of concentrated energy upon the lens surface.

The laser energy, being of a wavelength as described above, impinges upon the lens material and immediately vaporizes or sublimates the material. When the burst of energy ceases the lens material ceases to sublimate, leaving well-defined craters or sets of grooves in the lens surface and corresponding to the form of the masks selected. Despite the fact that the process generates sufficient heat to vaporize the lens material the edges of the symbols are not jagged or ridged but rather are rounded and smooth. Further, the sides and bottom of the grooves formed by sublimation are typically frosted, or at least translucent. It is this characteristic which, in part, detracts from the effectiveness of successive laser bursts, due, it is believed, to a scattering effect upon the incident light energy, and to the fact that energy is by design, focused at the surface of the target lens.

In general, any contact lens may be marked in accordance with the present invention, the only requirement being that electromagnetic radiation of the proper wavelength be used to effect the desired vaporization or sublimation of the lens material.

While the specific type of masking means used in the practice of the present invention is not critical, masks of beryllium have been found satisfactory. In the embodiment of FIG. 1, the beryllium masks have apertures formed therein in the shape of alphanumeric characters, although other identifying symbols may also be used. Further, the illustrated embodiment contemplates the use of a series of concentric masks which are sequenced through an appropriate gear drive. Accordingly, mask 22a defines the leftward-most character, herein "A". The next inner mask 22b is aligned so that the character "B" is next to "A". Finally the innermost mask 22c is oriented to present the character "C" radially inwardly of the first two characters. In this manner three characters at a time may be presented in the path of the beam.

By providing appropriate control means, such as a one-shot timer for example, within control 28, depression of button 36 will allow a timed pulse to energize stepping motor 20 for a predetermined period. Accordingly, the motor 20 operates through gear box 24 to rotate disks 22a–22c in the proper sequence so that the set of characters is incremented, for instance from ABC to ABD. Of course, the selection of characters is arbitrary and the number and format of the characters can be selected for any given application.

The light which is allowed to pass through the masks ("spatially filtered") is then passed through filter 25 and lens 26 which concentrates and focuses the beam onto lens 10. Preferably the beam is focused near the periphery of the lens, on the generally annular non-corrective zone which does not overlie the pupil. In this manner the indicia will not interfere with the vision of the lens wearer.

By pressing button 38 labeled "MARK" the control 28 energizes laser 14, whereupon a high-energy beam of light is transmitted through the masks and lens 26, impinging upon the surface of target lens 10 as described. The impingent radiation vaporizes or sublimates the material of the lens in a pattern corresponding to the openings in masks 22a–22c so that the legend "ABC" is formed in relief upon the lens surface. This activity is monitored by means of television camera 32, having appropriate optics for magnifying the image of lens 10 so that faults can be detected and the lens corrected or discarded as appropriate.

Upon pressing STEP button 36 a second function is implemented. In addition to incrementing the alphanumeric display formed by masks 22a–22b, stepping motor 18 is energized for a predetermined period to cause the transport mechanism to bring a succeeding lens blank 40 into registration with the path of the beam from laser 14. The system then maintains its position as an operator causes laser 14 to project a pulse of high intensity light energy through the newly-incremented masks, and onto an appropriate area of the lens.

The advantages of the above-described method are manifold. Firstly, while the indicia formed are substantially translucent they can easily be seen, for instance by side lighting, with simple optical magnifying apparatus. No foreign substance whatever is introduced to the lens; its chemical composition remains unchanged. No protrusions or irregularities are formed on the lens surface which would tend to abrade or irritate eyelid tissue, and moreover the marked lens is readily subjected to all of the usual hygienic regimens necessary for both hard and soft type lenses. The markings are eminently durable, not being prone to being worn off or abraded through use, and cannot flake off as would be the case with applied coatings. Moreover, the process described is ideally suited for high-volume production inasmuch as lenses need only be mounted upon an appropriate transfer mechanism and a mask assembly placed in proper alignment with the beam of high intensity light. No tooling, scribers, or chemically-resistant masks need be applied directly to the lens surface and the resolution of the characters is limited only by the quality of lens material and the wavelength of light used. Accordingly extremely small, high-resolution characters may be selected. Finally, by using indexible masks the nature of the markings can readily be automatically incremented without the need for replacing entire mask assemblies, or attempting to register miniature masks directly upon the lens surface as is the case with chemical etching processes.

Figure 2:
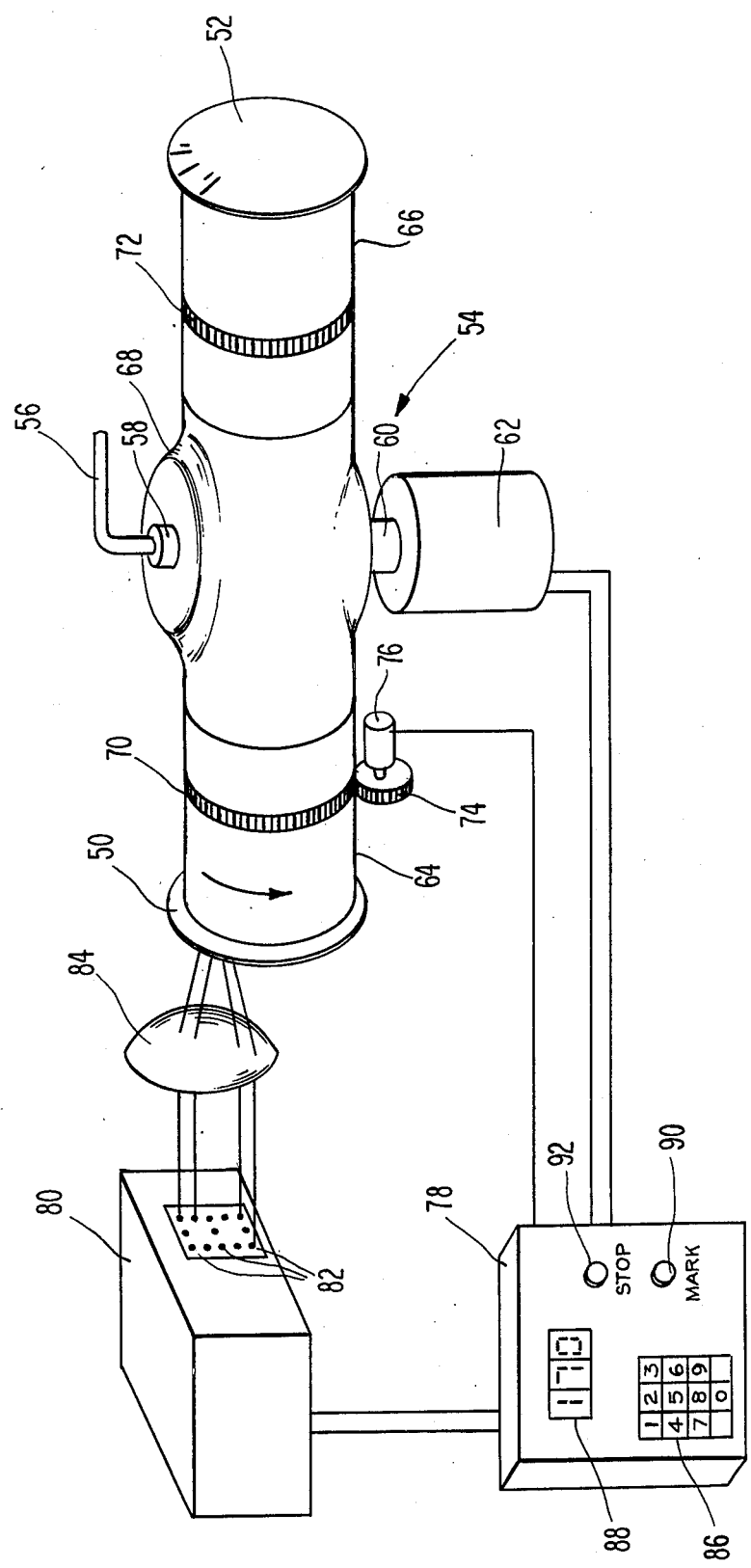
FIG. 2 illustrates another form of apparatus, adapted for applying indicia in serial fashion to a contact lens surface.

FIG. 2 depicts another embodiment of the present invention wherein an automatic indexing arrangement allows characters to be formed, one at a time, upon the face of a contact lens. Contact lenses 50 and 52 are disposed upon each end of a lens holding fixture generally indicated at 54. Opposing ends of the fixture are configured to generally match the inner or convex surface of a lens, and are provided with passages extending outwardly through fitting 56 by way of rotatable sealing member 58. Accordingly, by drawing a vacuum through fitting 56 lenses will be securely held upon the ends of the fixture. The fixture is journaled upon a shaft 60, which is coupled in turn to a stepping motor 62. Arms 64,66 of the fixture are rotatably journaled to a center protion 68 and provided with engaging areas 70, 72 which frictionally and/or mechanically engage mating teeth or notches upon a drive wheel 74. The latter is in turn driven by means of a second stepping motor 76. Both stepping motors 62 and 76 are operated by means of a master control 78 which may be operated either automatically, or semi-automatically by an operator.

Also operated by means of master control 78 is a power source 80 for an array of high intensity light emitting diodes 82. In the present embodiment, light emanates from a plurality of the diodes which are arranged in an appropriate configuration. In FIG. 2 the configuration for the diodes corresponds generally to the familiar 7-bar display; however, it will be recognized that the diodes may be arrayed in any desired configuration, depending upon the nature of the characters to be formed. Furthermore, this approach allows selection of specific combinations of wavelengths for maximizing interaction with different materials. If a lens material is transparent to one wavelength, another wavelength can be selected which interacts with the material. Each diode has its own characteristic wavelength. A lens 84 is interposed between the diodes and the contact lens 50 for concentrating and focusing the light emitted by the diodes upon an appropriate portion of the target lens 50.

In operation, an operator presses appropriate setting buttons 86 to cause the desired set of symbols to appear in readout window 88. Alternatively, a simple counter assembly within the master control may be used to increment the display automatically. This determines the characters, and the sequence thereof, which will be produced by selective energization of diodes 82. When the "MARK" control button 90 is depressed appropriate combinations of diodes 82 are energized for forming the first character of the desired display; in the present illustration, the numeral 1. Light energy from the diodes which are energized then traverses lens 84 and is focused upon the periphery of contact lens 50, sublimating the lens material to a controlled depth of 0.01 to 0.1 mm. Immediately thereafter, the diodes are deenergized and stepping motor 76 is operated to index member 64 about in the direction indicated. Indexing is quite short, being sufficient to move the previously-formed character from the field of the diode display so that a second character (in the present illustration the numeral "7") may be formed. Upon completing the indexing operation, as may be determined by a simple timer arrangement, an array of diodes corresponding to the second numeral "7" are energized. As before, the intensified light energy is concentrated and focused by means of lens 84 and impinges upon the surface of contact lens 50 to form the next character. As the diodes are deenergized stepper motor 76 again operates, and the process continues until all of the desired characters are formed along an arcuate locus near the periphery of the contact lens.

During the foregoing operation an operator or an automated machine element removes the lens from support 66 and places a new lens element thereon. In this manner when marking of one lens is completed, the apparatus 54 may be indexed around 180° by pushing STEP button 92. This energizes stepping motor 62 and brings the opposite end of the fixture into registration with the path of the diode light beams.

Of course, a plurality of lens-holding elements may be provided, the illustrated embodiment being only exemplary of a presently-preferred embodiment. However, through the use of the automatic stepping and indexing arrangement herein depicted it will be apparent that a single source of character-defining energy may be used. Further, while diodes are disclosed in the embodiment of FIG. 2, it is contemplated that alternative light sources, or a single light source coupled with an adjustable mask arrangement, can be substituted. The array can alternatively be constituted by fiber optic strands used in conjunction with a single light source, or by any other appropriate means of arraying the light energy in a desired pattern.

Figure 3:
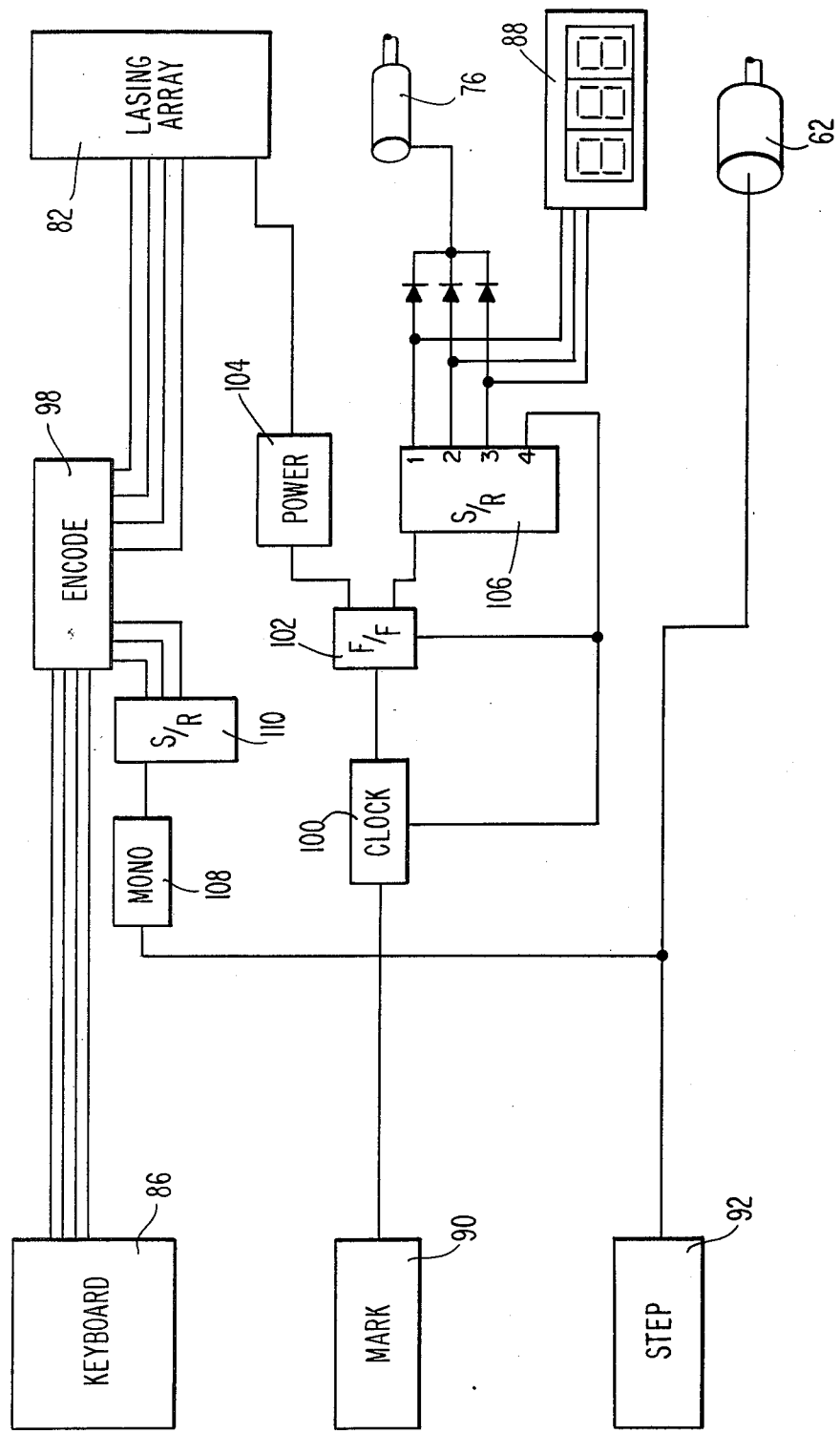
FIG. 3 is an example of one form of control system for use with the invention.

FIG. 3 illustrates one example of a control system for operating the automated lens marking apparatus of FIGS. 1 and 2. While the specific system shown is specifically intended for controlling the system of FIG. 2, it will become apparent to those skilled in the art that it can be readily adapted for use with the system of FIG. 1.

Appropriate members of keyboard 86 are first depressed to select a desired set of characters. Impulses from the keyboard are transmitted to a coding state 98 which in turn is connected to the array of lasing diodes 82. Coding stage 98 thus determines which of the arrayed diodes are to be energized. When MARK switch 90 is operated it initiates a counter or clock 100, which in turn operates a bistable element such as flip-flop 102. The flip-flop alternately energizes power stage 104 and a shift register or similar counter element 106. As register 106 is incremented alternately with energization of the lasing array by means of power stage 104, the stepping motor 76 is chosen to index the target contact lens about to present successive imprinting regions in the path of the laser beams. Display 88 is responsive to the state of coding stage 98, and provides visual indication and verification of the characters selected.

With the illustrated embodiment three characters are presented, so that stepping motor 76 is operated in response to the energization of the first three outputs of shift register 106. When the fourth register output is energized the signal is fed back for resetting flip-flop 102 to preclude subsequent energization of the lasing diodes. Additionally, the signal is applied to clock 100 for disabling the latter at which time the indicia forming operation is completed.

As set forth above, the next step is for an operator to depress STEP button 92 whereupon stepping motor 62 is operated for indexing the lens-bearing fixture about to present a fresh lens to the marking apparatus. In a preferred embodiment the STEP signal is also applied to a monostable circuit 108 which operates shift register 110 to automatically increment the coding stage 98 so that the next successive one of a series of characters is selected. Alternatively, selection of an appropriate character for each individual contact lens could be made by depressing appropriate buttons of keyboard 86.

Upon gaining an understanding of the present invention it will readily become apparent that appropriate control systems of various types can be devised, using conventional techniques and system components. Accordingly, it should be understood that various other controls may be implemented without departing from the teachings of the invention.

Illustrated near the periphery of contact lens 52 in FIG. 2 are a set of characters of binary nature. It is recognized that characters other than the generally-recognized alpha-numeric characters may be selected for use. Particularly where extremely small characters are used it may be desirable to provide only two character forms in order to preclude confusion. Further, the two-form or binary characters contemplated also facilitate automated or machine reading. The term "binary characters" as used herein refers to any sort of marking scheme in which two distinct characters are used to represent information in coded fashion. In this context long and short lines, large and small dots, or combinations of lines and dots as shown in FIG. 2 may be used. The invention is, however, extremely well adapted for use with any font or set of symbols which may be desired.

Further, inasmuch as the characters are formed by a beam of light their resolution can be made extremely high, and the size or aspect ratio of the display easily manipulated by standard optical means, such as lenses or mirrors.

In accordance with the above, it will now be appreciated that there has been disclosed a means and method for rapidly and efficiently applying permanent markings to ophthalmic contact lenses in a manner which provides excellent registration and repeatability, and avoids problems inherent in prior art approaches wherein chemical compositions of lenses were changed in localized areas, or foreign materials applied to the lens.

As will be evident from the foregoing description, certain aspects of the invention are not limited to the particular details of the examples illustrated, and it is therefore contemplated that other specifications or applications will occur to those skilled in the art. It is accordingly intended that the appended claims shall cover all such modifications and applications as do not depart from the true spirit and scope of the invention.

What is claimed is:

1. An ophthalmic lens adapted to be placed in direct contact with eye tissue formed of a transparent cross-linked polymer material, said lens being characterized by identifying indicia engraved in a surface thereof by subjecting said lens to a beam of radiation emerging from a laser having an intensity and wavelength at least sufficient to sublimate said polymer and form depressions in said lens surface to a depth less than the thickness of said lens, said lens having a smooth surface of unsublimated polymer material surrounding said depressions, and by varying in a predetermined manner the point at which said laser beam impinges upon said lens surfaces to engrave said identifying indicia in said lens surface.

2. A contact lens according to claim 1 wherein said lens is formed of a cross-linked hydrophilic polymer.

3. A contact lens according to claim 1 wherein said lens is formed of a cross-linked hydrophobic polymer.

4. A contact lens according to claim 1 wherein said lens is formed of an organo-metallic polymer.

5. A contact lens according to claim 2 wherein said lens is hydrated.

6. A contact lens according to claim 1 wherein said lens is formed of silicone polymer, resin, or rubber.

7. An article of manufacture comprising a soft lens adapted for disposition in direct contact with eye tissue formed of a transparent crosslinked polymer material and having a plurality of relieved zones formed in a surface thereof, said relieved zones being formed by the process of:

providing a source of high intensity electromagnetic radiation of a wavelength which will be absorbed by the lens material;

forming said radiation into a beam having a cross-sectional shape which corresponds to the shape of the desired relieved zones; and applying said beam of radiation to a surface of said lens for a predetermined period to effect sublimation of lens material in said zones to a depth less than the thickness of said lens material;

whereby relieved zones of the desired shape are formed, and whereby said surface of said lens surrounding said relieved zones is smooth and unaffected by said radiation.

8. An article according to claim 7, wherein said zones define coded characters.

9. An article according to claim 8, wherein said zones define at least one alphanumeric character.

10. An article according to claim 8, wherein said zones define at least one binary character.

* * * * *

UNITED STATES PATENT AND TRADEMARK OFFICE
CERTIFICATE OF CORRECTION

PATENT NO. : 4,194,814

DATED : March 25, 1980

INVENTOR(S) : David J. Fischer, et al

It is certified that error appears in the above—identified patent and that said Letters Patent is hereby corrected as shown below:

On the title page, item [22] should appear as shown below:

-- [22] Filed: Nov. 10, 1977
(Under 37 CFR 1.47) --

Signed and Sealed this

Fourteenth Day of October 1980

[SEAL]

Attest:

SIDNEY A. DIAMOND

Attesting Officer

Commissioner of Patents and Trademarks